(No Model.) 2 Sheets—Sheet 1.

A. GOODYEAR.
WHEEL PLOW.

No. 398,961. Patented Mar. 5, 1889.

Attest:
Sidney P. Hollingsworth
Herman Stollnitz

Inventor:
Andrew Goodyear
by Franck D. Johns
his Attorney (No Model.) 2 Sheets—Sheet 2.
A. GOODYEAR.
WHEEL PLOW.
No. 398,961. Patented Mar. 5, 1889.
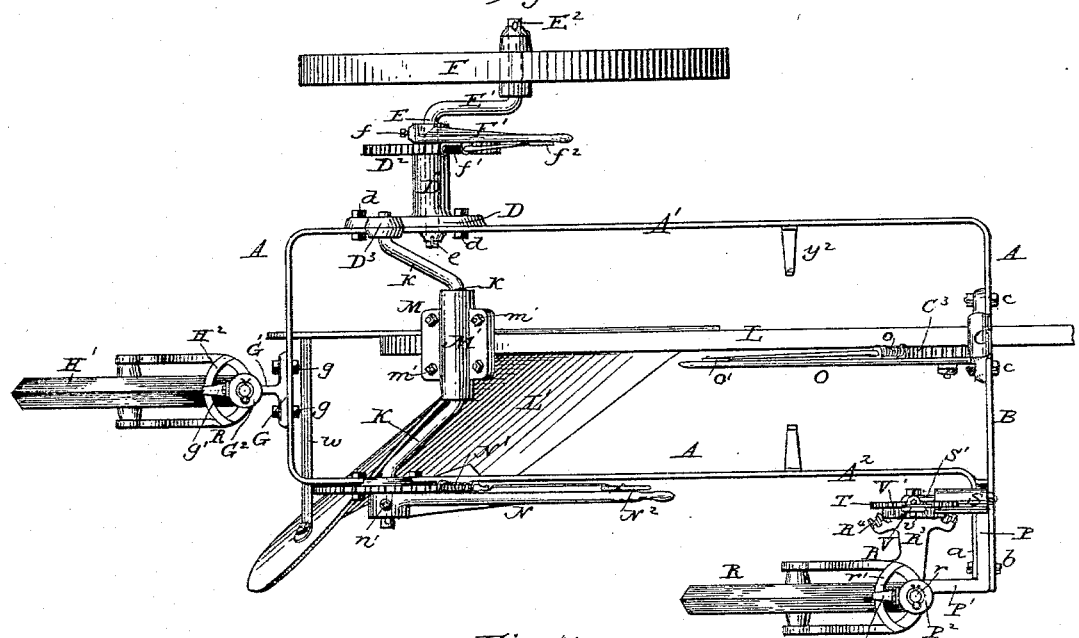
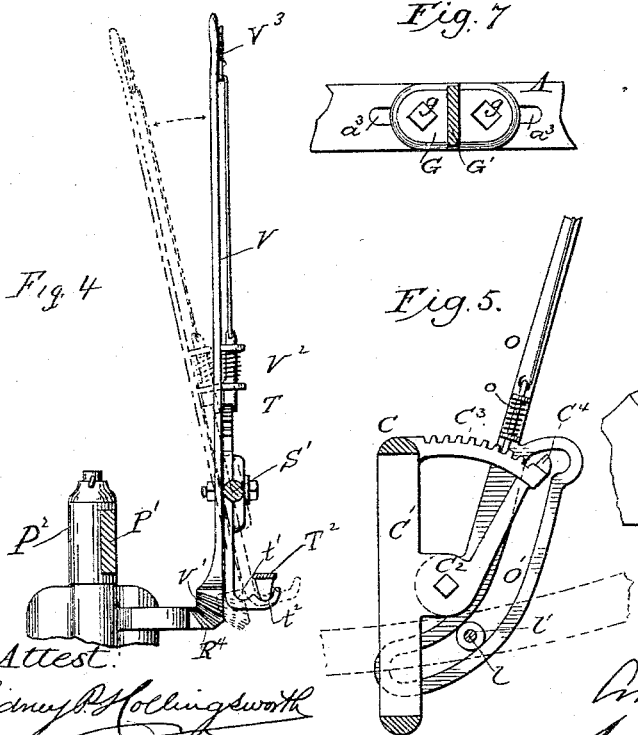
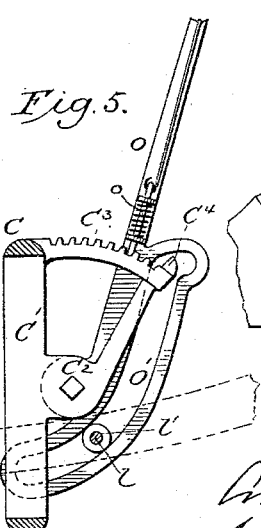
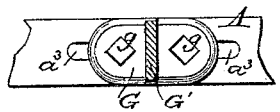
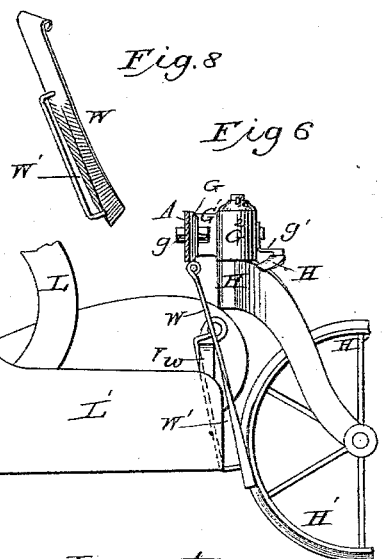
Attest:
Sidney P. Hollingsworth
Herman S. Hollerith
Inventor:
Andrew Goodyear
by Franck D. Johns
his Attorney

UNITED STATES PATENT OFFICE.

ANDREW GOODYEAR, OF SOUTH BEND, INDIANA, ASSIGNOR TO THE SOUTH BEND CHILLED PLOW COMPANY, OF SAME PLACE.

WHEEL-PLOW.

SPECIFICATION forming part of Letters Patent No. 398,961, dated March 5, 1889.

Application filed August 20, 1888. Serial No. 283,223. (No model.)

*To all whom it may concern:*

Be it known that I, ANDREW GOODYEAR, a citizen of the United States, residing at South Bend, in the county of St. Joseph and State of Indiana, have invented certain new and useful Improvements in Wheel-Plows; and I do hereby declare the following to be a full, clear, and exact description of the invention, such as will enable others skilled in the art to which it appertains to make and use the same.

My invention relates to improvements in wheeled plows, and has for its object to produce a light, cheap, durable, and effective plow so constructed that the tongue may be dispensed with; a further object being to carry the weight of the plow and operative mechanism on the wheels, thus reducing the riding and wedging friction on the bottom and landside of the plow to the minimum and making the lightest possible draft; a further object being to so construct and arrange the various parts that the driver will at all times have thorough control over the plow, so as to be able to regulate the depth and width of the furrow while the plow is in operation, and so that the plow may be pulled out from under the ground or any obstruction when the driver is sitting on the plow-frame and without getting off and pulling the frame or truck back, and, further, to be able to turn corners at right angles, whether to the right or left, while the plow is in the ground; and a further object of my invention is to provide the plow-frame with front and rear guiding caster-wheels so arranged that by keeping the front caster-wheel in the track made by the rear caster-wheel in the last furrow all the furrows will be of the same width, thus forming a self-gaging plow as to width of the furrows.

With these ends in view my said invention consists in certain novelty in the construction, arrangement, and combination of the various parts, all of which I will now proceed to point out and describe, reference being had to the accompanying drawings, in which—

Figure 1:
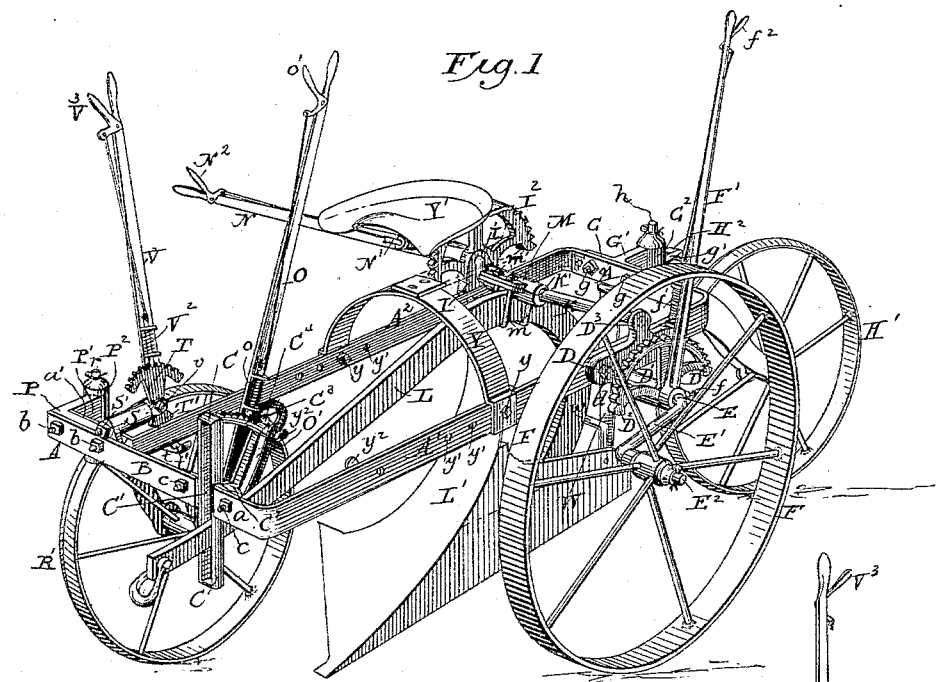
Figure 2:
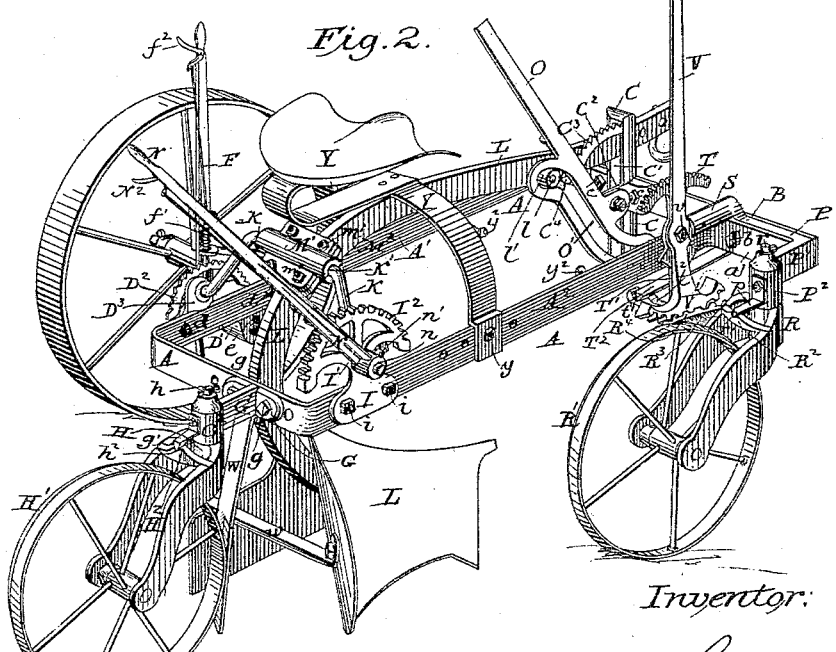

Figure 1 is a perspective of my said invention, showing the position of the various parts of the plow when at work. Fig. 2 is a perspective of the plow, taken on the opposite side from that shown in Fig. 1, showing the parts in the position they assume when going to or from the field when the plow is not in operation, the caster-wheels being shown at an angle to the line of draft of the landside-wheel. Fig. 3 is a plan view having the seat removed; and Figs. 4, 5, 6, 7, and 8 are details of various parts of my said invention.

Referring to said drawings, A represents a substantially U-shaped frame formed of a continuous piece of metal and having parallel sides $A'$ $A^2$, the end $a$ of the landside $A'$ of the frame being bent in toward the opposite side, $A^2$, and the end $a'$ of the furrow side $A^2$ being bent out from said frame.

B is a front cross-bar secured to the bent end $a'$ by suitable bolts, $b$. Said cross-bar extends beyond the furrow side of the forward end of the frame.

C is a casting secured between the ends of the bar B and end $a$ by means of suitable bolts, $c$. Said casting extends above and below the frame and at right angles to its horizontal plane and is provided with a vertical slot, $C'$, the object of which will be hereinafter described.

D is a casting secured to the landside of the frame by suitable bolts, $d$.

$D'$ is a sleeve-bearing projecting at right angles from said casting and provided on its outer end with a toothed sector, $D^2$.

E is a spindle mounted in the sleeve-bearing $D'$ and secured therein by a pin, $e$, inserted in a hole in its inner end, or by any other suitable means.

$E'$ is a crank-arm formed on the outer end of the spindle.

$E^2$ is a land-wheel spindle on the outer end of the crank-arm and projecting at right angles thereto.

F is a landside-wheel mounted on the spindle $E^2$.

$F'$ is a land-wheel lever having an aperture in its lower end through which the spindle passes.

$f$ is a set-screw, by means of which the lever is rigidly secured to the spindle at any desired point of adjustment. Said lever F is arranged in close proximity to the toothed sector $D^2$, and is provided with a spring-actuated dog, $f'$, adapted to engage the toothed sector and a hand-lever, $f^2$, with said dog. By operating the land-wheel lever said land-wheel may be adjusted at any desired elevation with relation to the frame.

G is a casting secured to the rear of the frame by suitable bolts and nuts, $g$, passing through suitable bolt-holes, $a^2$, in said frame. A series of bolt-holes are formed so that said casting may be adjusted to or from the landside of the frame. If desired, a slot may be formed in the rear of the frame instead of the bolt-holes, as shown at $a^3$, Fig. 7. Said casting G has a rearwardly-projecting arm, G', in the end of which is formed a vertical bearing, $G^2$.

H is the yoke of a rear caster-wheel, H', and is provided with the upwardly-projecting pintle $h$, which is mounted in the bearing $G^2$, and is secured therein by any suitable means. Said yoke is provided with a segmental cross-bar, $H^2$, having in the center of its upper side a notch, $h^2$, with which a spring-latch, $g'$, engages and holds said caster-wheel substantially parallel with the landside-wheel. Said rear caster-wheel follows behind the plow and makes a track in the furrow, and, it will be seen, can be adjusted to or from the wall of the furrow, for a purpose hereinafter set forth.

I is a casting secured to the furrow side of the frame by suitable bolts and nuts, $i$.

I' is a bearing formed in said casting above the frame.

$I^2$ is a vertical toothed sector formed on said casting above the bearing I'.

$D^3$ is a bearing in the casting D, located above the frame. When the castings D and I are secured to the frame, they are so arranged that the bearings $D^3$ and $I^2$ will be directly opposite each other.

K is a crank-shaft having its ends mounted in the bearings $D^3 I^2$, and having the crank portion K'.

L is the plow-beam, carrying on its lower rear end a plow, L'.

M is a box or hanger formed in two parts, M' $M^2$, loosely mounted on the crank portion of the shaft K, and secured to the plow-beam by U-shaped loops $m$, having clamping-nuts $m'$. Said box is secured to the plow-beam at a point back of the center of gravity of the plow and beam, whereby, when said plow and beam are free, the rear portion or heel of the plow will be first lifted as the crank portion of the shaft is turned back.

N is a lifting-lever having an aperture, $n$, in its lower end, through which the furrow-side end of the shaft K passes, said lever being rigidly secured to the end of said shaft by means of a set-screw, $n'$, at any desired adjustment. The lever is located in close proximity to the toothed sector $I^2$ and within convenient reach of the driver, and is provided with a spring-actuated dog, N', adapted to engage with the toothed sector $I^2$ and a hand-lever, $N^2$, connected with said dog. The crank-shaft is operated by the lifting-lever and the plow raised or lowered as said shaft is turned. The forward end of the plow-beam L projects through the vertical slot C' in the casting C, and is provided on its end with a suitable clevis, to which the team is attached.

$C^2$ is a rearwardly-extending projection on the casting C, at one side of the vertical slot.

$C^3$ is a toothed sector secured to and extending back from the top of said casting C over the projection $C^2$ and provided at its rear end with a stop, $C^4$.

O is a lever pivoted to the projection $C^2$, and is provided with a spring-actuated dog, $o$, adapted to engage with the toothed sector and a hand-lever, $o'$, connected with said dog. Said lever is also provided with a substantially S-shaped slot, O'.

$l$ is a pin secured to and projecting from the forward portion of the side of the beam approximate to the lever. Said pin engages with the slot O' and is provided with an anti-friction roller, $l'$. The roller may, if desired, be dispensed with. I, however, prefer to use the same.

When the plow is lowered to an operative position, the pin travels down toward the lower portion of the slot O', and to force the point of the plow into the ground the lever O is moved forward, and the upper curved side of the lower part of the slot, engaging with the pin, forces the forward end of the beam down toward the bottom of the vertical slot C', and consequently forces the point of the plow into the ground to the desired depth. It will thus be seen that the driver can at all times regulate the depth of plowing by means of the levers O and N. When the plow is not in operation, it is raised by means of the lever N. The forward end of the beam moves to the top of the vertical slot and the pin $l$ to the upper part of the slot O', the lever O having been first drawn back, as shown in Fig. 2.

P is a casting secured between the projecting end $a'$ of the furrow side of the frame and the outer end of the cross-bar B by means of the bolts $b$, which connect said parts, said bolts passing through suitable bolt-holes in the casting.

P' is an arm formed on the end of said casting and projecting rearwardly at right angles thereto and parallel with the furrow side of the frame. $P^2$ is a vertical bearing in the rear end of said arm.

R is the yoke of the forward guiding caster-wheel, R', having the upwardly-projecting pintle $r$, which is mounted in the bearing $P^2$.

$R^2$ is a segmental cross-bar on top of the yoke, having in the center of its upper side a notch, $r'$, with which a spring-latch, $p$, engages and holds said yoke, so that the lines of travel of the forward and rear caster-wheels will be parallel.

$R^3$ is a horizontal arm projecting from the side of the yoke approximate to the frame and having on its end a beveled segment-gear, $R^4$.

S is a sleeve-bearing formed on the casting P, said bearing extending back from the casting and parallel with the side of the frame.

S' is a short shaft or bolt mounted in the bearing S and provided with a suitable retaining-nut on its forward end, and having rigidly secured to its rear end an upwardly-projecting toothed sector, T, and a downwardly-projecting arm, T', having its end $t$ bent at right angles thereto and provided on the upper side with two notches, $t'$ $t^2$, with which a spring-latch, $T^2$, is adapted to engage, said latch being secured to the under side of the casting P.

V is a lever pivotally secured to the rear end of the shaft or bolt S' by a bolt and nut, $v$, said lever having on its lower end a beveled segment-gear, V', which is adapted to engage with the beveled segment-gear $R^4$. Said lever is also provided with a spring-actuated dog, $V^2$, adapted to engage with the toothed sector and a hand-lever, $V^3$, connected with said spring-dog. By moving the upper end of the lever V out from the frame the shaft or bolt S' turns in its bearing, and the segment-gear V' is disengaged from the segment-gear $R^4$ and is held disengaged by means of the spring-latch $T^2$, engaging with the notch $t^2$ in the end of the arm T'. When thus disengaged, the spring-latch $p$ engages with the notch in the cross-bar and holds the forward guiding-wheel parallel with the rear guiding-wheel. This is the position of the several parts in ordinary plowing. If, however, it is desired to turn the forward guiding-wheel to cause the plow to run more or less to land or to turn corners, &c., the lever V is moved until the latch is released from the notch $t^2$ and engages with the notch $t'$. When in this position, the segment-gears V' and $R^4$ are in engagement. Then by disengaging the spring-dog of the lever from the toothed sector the lever can be moved back or forward, and by means of the segment-gears the forward guiding caster-wheel turned to the right or left, as desired. The spring-dog, engaging with the sector, holds said guiding-wheel as adjusted. The tires of both the front and rear caster-wheels are beveled on each side of the center, so as to form in cross-section an inverted V.

W is a depending brake-bar hinged to the under side of the casting G. Said brake-bar is V-shaped in cross-section and conforms to the shape of the cross-section of the tire of the rear caster, with which it is adapted to engage and form a brake when the plow is not in operation.

$w$ is a cross-bar extending across the rear of the plow from the landside to the moldboard. When the plow is raised and moved backward by its lifting-lever, the cross-bar $w$ engages with the brake W and forces it against the rear caster-wheel, thus producing a thorough and effective brake, which is greatly needed when the plow is not in operation and is going to or from the field. If desired, the brake-bar may be formed with a longitudinal slot, W', through which the cross-bar $w$ passes, as shown in Fig. 8.

Y is a bridge adjustably secured to the sides of the frame by bolts $y$.

Y' is the driver's seat, mounted on a suitable spring secured to the bridge. A series of bolt-holes, $y'$, are formed in the sides, so that the seat may be moved forward or backward on the frame, as desired.

$y^2$ are foot-rests.

The operation of my improved plow is as follows: In going to or from the field, or when the plow is not in operation, the land-wheel lever is moved forward, throwing the crank carrying the land-wheel down until the bottom of the land-wheel is in the same horizontal plane with the bottom of the two caster-wheels. The plow is raised by drawing the lifting-lever or crank-shaft back, the rear end of the plow first raising the forward end of the beam and then dropping down to the bottom of the vertical slot, through which it passes. The brake is applied, as already described, by moving the lifting-lever still farther back, so as to cause the cross-bar or brace to press the brake against the tire of the rear caster-wheel. By means of this brake the plow is prevented from running against the team when going downgrade, and it is an important feature of my invention, as no tongue is used. Now, by moving the lever V so that its segmental gear engages with the segmental gear on the yoke of the forward guiding-wheel, said wheel can be turned in any direction by said lever, so that the plow can be readily and easily guided and be thoroughly under the control of the driver. When in operation the land-wheel lever is drawn back. This raises the crank carrying the land-wheel, so as to raise said land-wheel to permit it to ride on the land, and also establishes the general depth of plowing. This lever, it will be seen, is in convenient reach of the driver, so that he can at all times adjust the land-wheel at the proper elevation with relation to the frame and caster-wheels.

To adjust the plow in an operative position, the lifting or crank-shaft lever is moved forward, turning the crank of the shaft forward and down until the point of the plow enters the ground. Then by means of the lever having the S-shaped slot the end of the beam is forced down until the plow enters the ground to the desired depth, and is held at this depth by means of the spring-dog and sector connected with said lever. Should the plow at any time strike any obstruction, it can easily and quickly be pulled back and out from under the same by simply operating the several levers, as described, and without getting off the frame and pulling the same back. The rear caster-wheel, being laterally adjusted on the rear of the frame, may be set at any desired distance from the wall of the landside, and, being provided with a beveled or inverted V-shaped tire, makes a track in said furrow as it follows the plow.

The front caster-wheel, also having an inverted-V-shaped tire, is adapted to travel in the track the rear caster-wheel made in the last furrow, thus forming a self-gaging plow as to width of the furrow, which is predetermined and accurately regulated by adjusting the rear caster-wheel to or from the wall of the landside. In ordinary plowing the automatic spring-latches on the front and rear caster-wheels hold them substantially parallel. When, however, it is desired to throw the plow more or less to land, the lever V is thrown into engagement, and the forward guiding-wheel is adjusted at any required angle to effect the purpose desired. This feature of my invention also becomes essential in plowing on the side of an incline. The forward guiding-wheel can be set at the right angle of travel, so that the plow will take the proper amount of land to throw the furrow up or down hill, and also keep the furrow-horse in his proper position in the furrow. A great advantage is seen in plowing the last furrow, where there is no landside resistance. The front guide-wheel is set at the proper angle and the last furrow easily lifted out without any bearing for the landside. I am thus enabled to reduce the friction on the bottom and landside to the minimum and make the lightest possible draft on the team, as it is a well-established fact, known to all practical plow makers and users, that it takes more draft to overcome the landside and bottom friction than to turn the furrow. By means of the adjustable forward guiding-wheel the plow can be made to turn corners at right angles to the right or left while in the ground. This guiding-wheel is also of service at the end of a furrow when it is desired to lift the plow out and drive around, as is done in back furrowing.

When the plow or frame is not provided with a pole, it would be almost impossible to guide it properly and keep the team in their proper position; but by using the lever of the guide-wheel it can be easily guided into the furrow in the right position. The beveled or inverted-V-shaped tires of the wheels also serve to prevent the plow from sliding laterally when the landside friction is transferred to said wheels.

As described, I dispense with the tongue, which is always a source of annoyance to the team. However, a tongue may, if desired, be used with my improved plow.

It is apparent that various changes may be made in the details of construction and arrangement of the several parts of my said invention without materially departing from the spirit and scope of the same, and I do not wish to be understood as limiting myself to the specific construction herein set forth; but,

Having thus fully described my invention, what I claim as new, and desire to secure by Letters Patent, is—

1. In a wheel-plow, the combination, with a frame and a plow supported thereon, of a guiding-wheel secured to the furrow side of the forward portion of said frame, a spring-latch holding said wheel substantially parallel with the landside of the plow, a lever pivotally secured to the frame, and means for connecting said lever with the guiding-wheel, whereby the spring-latch may be released and said wheel turned at any desired angle to guide the plow, substantially as shown and described.

2. In a wheel-plow, the combination, with a frame, a landside-wheel secured thereto, and a plow supported on said frame, of a caster-wheel secured to the rear of the frame, a spring-latch holding said caster-wheel parallel with the landside of the plow, a guiding caster-wheel secured to the furrow side of the forward portion of the frame, a spring-latch holding said forward caster-wheel parallel with the rear caster-wheel, and a lever pivotally secured to the frame, and means, substantially as described, for connecting said lever with the forward guiding caster-wheel, whereby the spring-latch may be released and said caster-wheel turned by said lever at any desired angle to guide the plow, all constructed, arranged, and operating substantially as set forth.

3. In a wheel-plow, the combination, with a frame and a plow supported thereon, of a guiding caster-wheel secured to the furrow side of the forward portion of the frame, a spring-latch holding said guiding-wheel substantially parallel with the landside of the plow, a segment-gear formed on the yoke of the guiding caster-wheel, a shaft mounted in a bearing on the frame, an upwardly-projecting toothed sector rigidly secured to said shaft and provided with a downwardly-projecting arm having a notched end, a spring-latch secured to the frame and engaging said notched end, and a lever pivotally secured to the shaft and provided with a spring-actuated dog adapted to engage with the toothed sector and having a segment-gear on its lower end adapted to be thrown in or out of gear with the gear on the yoke of the caster-wheel and to be held as adjusted by the spring-latch, all constructed, arranged, and operating substantially as shown and described.

4. In a wheel-plow, the combination, with a frame and a plow supported thereon, of a guiding caster-wheel, R′, secured to the forward end of the furrow side of the frame, a spring-latch, $p$, adapted to hold said caster-wheel substantially parallel with the landside of the plow, a beveled segment-gear, $R^4$, secured to and projecting from the yoke of the caster-wheel, a bearing, S, formed on the frame, a shaft, S′, mounted in said bearing and having rigidly secured to its rear end an upwardly-projecting toothed sector and a downwardly-projecting arm, T′, having a hook end, $t$, provided with notches $t'$ $t^2$, a spring-latch, $T^2$, secured to the frame and adapted to engage with said notches, and a lever, V, pivotally secured to the shaft S′ and provided with a spring-actuated dog adapted to engage the toothed sector, and a beveled segment-gear, V', on its lower end, adapted to be thrown in or out of engagement with the gear R⁴ and to be held as adjusted by the spring-latch T², all constructed, arranged, and operating substantially as shown and described.

5. In a wheel-plow, the combination, with a substantially U-shaped frame, a plow supported on said frame, a landside-wheel secured thereto, a casting, G, secured to the rear of the frame and laterally adjustable thereon and having a rearwardly-projecting arm, G', a vertical bearing, G², in said arm, a caster-wheel, H', having the pintle $h$ of its yoke H mounted in the bearing G', and the segmental cross-bar H², having a notch, $h^2$, and a spring-latch adapted to engage with said notch, of a forward cross-bar, B, secured to the forward portion of the frame and projecting beyond its furrow side, a casting, P, secured to the extension of the cross-bar, a rearwardly-projecting arm, P', formed on said casting, a vertical bearing, P², formed in said arm, a caster-wheel, R', having the yoke R and pintle $r$ mounted in said bearing P², and the segmental cross-bar R², provided with the notch $r^2$, and a spring-latch, $p$, adapted to engage with said notch, all constructed, arranged, and operating substantially as shown and described.

6. In a wheel-plow, the combination, with a frame supported upon suitable carrying-wheels, a crank-shaft mounted upon said frame, a lifting-lever secured to the crank-shaft, and a plow-beam pivotally secured to said crank-shaft and carrying on its rear end a plow, of a lever pivotally secured to the forward end of frame and having a substantially S-shaped slot therein, and a pin on the forward end of the plow-beam engaging with said slot, all constructed, arranged, and operating substantially as shown and described, whereby, as the lever is moved back, the forward end of the beam will be forced down, so as to cause the point of the plow to enter the ground.

7. In a wheel-plow, the combination, with a frame having the vertical slot C' in its forward end and supported upon suitable carrying-wheels, a crank-shaft mounted on said frame, a lifting-lever secured to the shaft, and a plow-beam, L, pivotally secured to said crank-shaft, carrying on its rear end a plow and having its forward end projecting through the vertical slot C', of a toothed sector, C³, secured to the frame at one side of the vertical slot, a lever, O, pivotally secured to the frame and provided with a spring-actuated dog, $o$, adapted to engage with the toothed sector and a hand-lever, $o'$, connected with said dog, a substantially S-shaped slot, O', in said lever, and a pin, $l$, on the forward part of the beam, engaging with said slot O', all constructed, arranged, and operating substantially as shown and described, as and for the purpose set forth.

8. In a wheel-plow, the combination, with a frame, a wheel secured to the rear of the frame, a crank-shaft mounted on said frame, a plow-beam pivotally secured to the crank-shaft and carrying on its rear end a plow, a lifting-lever secured to said crank, and a cross-bar or brace extending across the rear of the plow, of a depending brake-bar hinged to the rear of the frame in front of the rear wheel and adapted to engage with the cross-bar or brace as the plow is lifted by its crank-shaft and moved back so as to be forced against the tire of the rear wheel, and thus form a brake for the plow, all constructed, arranged, and operating substantially as shown and described.

9. In a wheel-plow, the combination, with a frame, a wheel secured to the furrow side of the forward portion of the frame, a casting secured to the rear of the frame and laterally adjustable thereon, and a wheel secured to said casting and adapted to travel in a line parallel with the forward wheel, of a depending brake-bar hinged to the adjustable casting in front of the rear wheel, a plow-beam mounted on said frame and carrying a plow on its rear end, and means for raising and lowering the beam, whereby as said beam is raised the plow will engage the brake-bar and force it against the rear wheel, substantially as shown and described, as and for the purpose set forth.

10. In a wheel-plow, the combination, with the frame, a landside-wheel secured thereto, a caster-wheel secured to the furrow side of the forward portion of the frame, a casting, G, secured to the rear of the frame and laterally adjustable thereon, a caster-wheel, H, secured to said casting, a crank-shaft mounted on the frame, a plow-beam, L, pivotally secured to the crank-shaft and carrying on its rear end a plow, L', a lifting-lever secured to said crank-shaft, and a cross-bar or brace, $w$, extending across the rear of the plow, of a depending brake-bar hinged to the casting G in front of the caster-wheel H and adapted to be engaged by the cross-bar or brace on the plow and be forced against the tire of the rear caster-wheel when said plow is lifted by its crank-shaft and moved back, thus forming a brake for the same, all constructed, arranged, and operated substantially as shown and described.

In testimony whereof I affix my signature in presence of two witnesses.

ANDREW GOODYEAR.

Witnesses:
A. H. REMINGTON,
O. M. KNOBLOCK.